(12) United States Patent
Hansen

(10) Patent No.: US 10,258,146 B2
(45) Date of Patent: Apr. 16, 2019

(54) SAFETY BRAKE FOR TELESCOPING FURNITURE POST

(71) Applicant: Kesseböhmer Produktions GmbH & Co . KG, Weilheim/Teck (DE)

(72) Inventor: Melf Hansen, Gondelsheim (DE)

(73) Assignee: KESSEBÖHMER PRODUKTIONS GMBH & CO. KG, Weilheim/Teck (DE)

( * ) Notice: Subject to any disclaimer, the term of this patent is extended or adjusted under 35 U.S.C. 154(b) by 0 days.

(21) Appl. No.: 15/104,062

(22) PCT Filed: Dec. 13, 2013

(86) PCT No.: PCT/EP2013/076583
§ 371 (c)(1),
(2) Date: Jun. 13, 2016

(87) PCT Pub. No.: WO2015/086093
PCT Pub. Date: Jun. 18, 2015

(65) Prior Publication Data
US 2016/0360878 A1 Dec. 15, 2016

(51) Int. Cl.
A47B 9/10 (2006.01)
A47C 3/30 (2006.01)
F16F 9/512 (2006.01)
F16F 9/19 (2006.01)
F16F 9/34 (2006.01)

(52) U.S. Cl.
CPC ............... *A47B 9/10* (2013.01); *A47C 3/30* (2013.01); *F16F 9/19* (2013.01); *F16F 9/34* (2013.01); *F16F 9/5126* (2013.01)

(58) Field of Classification Search
CPC ..... A47B 9/10; F16F 9/348; F16F 9/19; F16F 9/5126; A47C 3/30
USPC ........................................... 188/282.5, 282.6
See application file for complete search history.

(56) References Cited

U.S. PATENT DOCUMENTS 2,911,072 A   11/1959  Schedl
4,460,074 A *  7/1984  Muller .................... F16F 9/341
                                                188/282.6

(Continued)

FOREIGN PATENT DOCUMENTS

CN    201021704 Y    2/2008
CN    101737372 A    6/2010

(Continued)

OTHER PUBLICATIONS

Office Action issued by Chinese Patent Office dated Jul. 24, 2017 in Chinese Application 201380081612.1, partial machine translation provided.

(Continued)

*Primary Examiner* — Eret C McNichols
(74) *Attorney, Agent, or Firm* — Hassan Abbas Shakir; Shakir Law PLLC

(57) ABSTRACT

A braking device for a height-adjustable item of furniture is provided within a gas pressure spring. The braking device includes piston, which is arranged within a cylinder and in which a first fluid passage is provided, as well as a piston rod and a second fluid passage, wherein a maximum speed of the height adjustment can be controlled by regulating the fluid passage within the gas pressure spring.

12 Claims, 2 Drawing Sheets

(56) References Cited

U.S. PATENT DOCUMENTS

| | | | | |
|---|---|---|---|---|
| 4,485,900 | A * | 12/1984 | Kato | F16F 9/3484 137/854 |
| 4,895,229 | A * | 1/1990 | Kato | F16F 9/3484 188/280 |
| 5,316,113 | A * | 5/1994 | Yamaoka | F16F 9/3484 188/282.6 |
| 5,325,942 | A * | 7/1994 | Groves | F16F 9/3484 188/282.6 |
| 6,026,755 | A | 2/2000 | Long | |
| 6,116,388 | A * | 9/2000 | Bataille | F16F 9/348 188/282.5 |
| 6,247,563 | B1 * | 6/2001 | De Carbon | F16F 1/32 188/282.5 |
| 6,336,536 | B1 * | 1/2002 | Fenn | F16F 9/3485 188/282.6 |
| 6,672,436 | B1 * | 1/2004 | Keil | F16F 9/3214 188/282.4 |
| 6,802,408 | B2 * | 10/2004 | Krammer | F16F 9/348 188/282.1 |
| 7,213,689 | B2 * | 5/2007 | Chang | F16F 9/3228 188/280 |
| 8,127,901 | B1 * | 3/2012 | Lu | F16F 9/585 188/282.5 |
| 8,181,758 | B2 * | 5/2012 | Liang | E05F 5/10 188/282.6 |
| 8,246,102 | B2 * | 8/2012 | Lange | E05C 17/305 296/146.4 |
| 9,682,605 | B2 * | 6/2017 | Ankney | B60G 17/08 |
| 2003/0075845 | A1 | 4/2003 | Krammer | |
| 2011/0024247 | A1 * | 2/2011 | Chikamatsu | F16F 9/348 188/322.15 |
| 2015/0354656 | A1 * | 12/2015 | Tanaka | F16F 9/3484 188/322.15 |

FOREIGN PATENT DOCUMENTS

| | | |
|---|---|---|
| DE | 2001465 A1 | 7/1971 |
| DE | 102006013366 A1 | 9/2007 |
| DE | 102010031144 A1 | 1/2012 |
| EP | 1241374 A1 | 9/2002 |
| EP | 1987734 A1 | 11/2008 |
| FR | 1419551 A | 12/1965 |
| KR | 20120005971 A | 1/2012 |
| WO | 2006029421 A1 | 3/2006 |

OTHER PUBLICATIONS

Internation Preliminary Report om Patentability for parent application PCT/EP2013/076583, translation provided.

International Search Report for priority application PCT/EP2013/076583 dated Jun. 18, 2015, translation provided.

Examination report No. 2 for standard patent application dated Aug. 23, 2017 issued by IP Australia in corresponding application AU 2013407407.

* cited by examiner

SAFETY BRAKE FOR TELESCOPING FURNITURE POST

BACKGROUND OF THE INVENTION

1. Field of the Invention

The present invention is directed to height-adjustable columns for furniture, in particular tables.

2. Discussion of the Related Art

The height-adjustable table legs are known to be made of a multi-part column, e. g., a three- or two-part column, the latter consisting of an inner column and an outer column, which are of telescopic design and may be retracted or extended. The outer column may be tightly connected to a base and forms a static unit. The inner column may be connected to the table plate, thereby forming a movable portion of the item of furniture. Typically, drives, which may be operated manually or by electric motor, are disposed within the telescopic column.

Increasingly, however, tables having a height which is adjusted by means of a gas pressure spring provided in one or more table legs are used. Therein, for example, the piston of the gas pressure spring is connected to the static unit of the furniture column and the piston rod of the gas pressure spring is connected to the movable portion such as the table plate or the inner column.

From the prior art according to EP 1 987 734 B1 a table height adjustable by means of a gas pressure spring is known. The table described therein, for which, as an example, two furniture columns are provided, includes an suitable synchronization device, so that a uniform height adjustment of the entire table is also guaranteed when only one gas pressure spring is provided in only one of the columns.

A height-adjustable table having at least one gas pressure spring has, compared to motor-driven adjustable tables, the advantage that the height adjustment can be performed in a much shorter time. Moreover, such a table does not have to be connected to a power supply, saving not only costs but also having a positive effect on the design of the table by omitting any cables.

Before the actual height adjustment of the furniture column, typically a securing means in the form of a lever or a button needs to be actuated. Such a securing means prevents that placing heavy objects on the item of furniture or removing heavy objects from the item of furniture, or a too high or too low load weighing on the table plate during the height adjustment result in an undesired upwards of downwards movement of the furniture column. However, since said height-adjustable items of furniture, in particular tables, sometimes need to carry heavy loads, it is possible that, even when unsecuring the securing means, a sudden drop of the movable portion of the height-adjustable table may occur, possibly resulting in damage to the table or the objects placed thereon or, more importantly, causing injury to the user.

In tables with a gas pressure spring, the latter is usually set to a certain permissible weight above which or below which no height adjustment is possible despite actuation of the securing means, according to the prior art. Advantageously, this weight can be set by means of an additional gas storage which, depending on the wishes of the consumer, can also be arranged on the item of furniture itself.

Moreover, devices are known, wherein the operating lever is connected via a cable system to a locking mechanism, through which the synchronizing means extend. Therein, the locking mechanism measures the tensile forces applied to the synchronization means and enables a height adjustment only if the forces are in equilibrium.

A disadvantage of such systems is, however, that this type of safety measure can be overcome by the user when the user, for example, shakes the movable portion or applies the users' weight to the table plate. If the system is bypassed, a sudden upward or downward movement of the movable portion can occur, which in turn carries large potential for injury.

SUMMARY OF THE INVENTION

It is therefore an object of the present invention to provide height-adjustable furniture columns for desks, in which the above-mentioned hazards can be prevented by a suitable braking device which can be manufactured cost-effectively and which, in particular, allows to prevent an uncontrollable movement of the movable portion of the item of furniture even in case of an accidental unsecuring.

An optimized height adjustment of an office table, for example, is among the essential requirements for the manufacturer, in order to allow the user to work ergonomically. Therefore, table legs are provided, which allow adjusting the table height based on individual needs.

Essentially, the braking device according to the invention consists of a gas pressure spring having a restricting device. This ensures that the height adjustment never exceeds a maximum speed even in an unsecured state, whereby an uncontrollable upward or downward movement of the movable portion of the table is avoided.

Herein, a commonly known gas pressure spring may be applied, in which the restriction is carried out by regulation of the fluid passage within the gas pressure cylinder.

BRIEF DESCRIPTION OF THE DRAWINGS

The invention will be explained in more detail below with reference to the embodiments shown in the drawings. In the drawings.

DETAILED DESCRIPTION OF THE INVENTION

Figure 1:
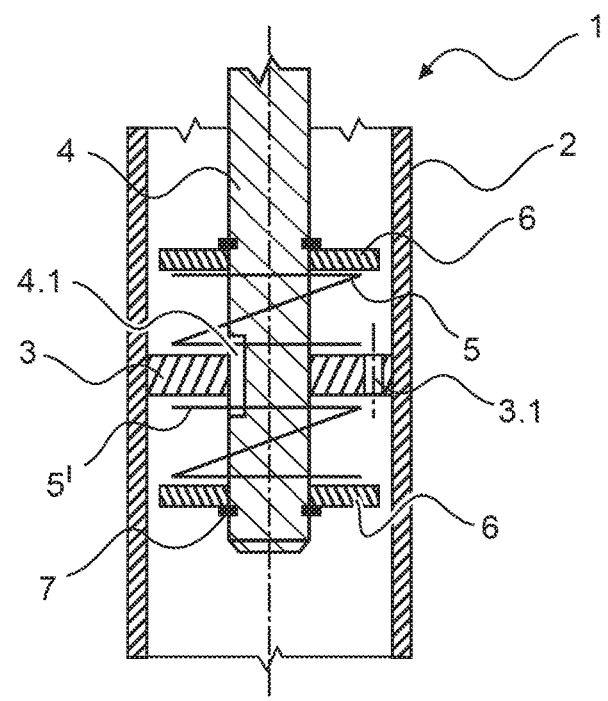
FIG. 1 is a cross-section view of a first embodiment of the invention.

FIG. 1 shows a portion of a gas pressure spring in accordance with a first embodiment of a safety brake according to the invention, this braking device being provided within a gas pressure spring. The gas pressure spring 1 typically comprises a cylinder 2, a piston 3 and a piston rod 4 and is set to a desired weight range.

The piston 3 is movable relative to the piston rod 4 and the cylinder 2, and further includes a nozzle, which serves as a first fluid channel 3.1. Furthermore, the piston 3 is held in a predetermined position (normal position) by two springs 5 and 5' when the gas cylinder is in an idle state or is operated within the set weight range (normal state). However, it is not required that the first fluid channel 3.1 is formed as a nozzle in the piston 3 itself. Rather, it is only required that a piston upper side and a lower piston side are fluidically connected to each another, which can also be realized by the piston 3 having a recess along its circumference or the diameter of the piston 3 being smaller by a predetermined amount, in total, than the diameter of the cylinder 2.

The springs 5 and 5' are each supported by two identical disk elements 6, which in turn are respectively held by locking rings 7 which are fitted into grooves provided in the piston rod 4.

The piston rod 4 is provided with a milled recess 4.1 which functions as a second fluid passage in addition to the nozzle 3.1 of the piston 3. During normal operation of the gas pressure cylinder 1 within the set weight range, the fluid can thus pass through both channels 3.1 and 4.1, whereby the pressures on both sides of the piston 3 are in equilibrium.

In a case, in which, for example, a load higher than the preset weight is placed on the table plate, the piston rod 4 is pressed down by the weight and undergoes acceleration. If a predetermined speed is reached in the process, an equalization of pressure as usual within the gas pressure spring cannot occur and—in this example—a pressure increase on the lower piston side arises. This pressure increase causes a displacement of the second fluid channel 4.1 relative to the piston 3 and against the compressive force of the spring, and the piston rod 4 is moved until the fluid channel 4.1 is completely closed. As a result, the fluid flow can only occur via the nozzle 3.1, whereby the entire system within the gas pressure cylinder is damped by the resulting pressure on the lower piston side and the speed is reduced. A rapid drop of the movable portion is thus effectively prevented.

If the height adjustment is interrupted or the table is relieved of the load again, the spring 5 causes a relative return movement of the position of the second fluid channel 4.1 with respect to the position of the piston (normal position), whereby the fluid passage 4.1 is reopened.

In a case, in which the table weight is reduced before the adjustment by removing a heavy object located on the table plate, for example, and thereby the preset weight is underrun, the system also acts in the opposite direction, whereby a rapid upwards movement of the table plate can be prevented.

Figure 2:
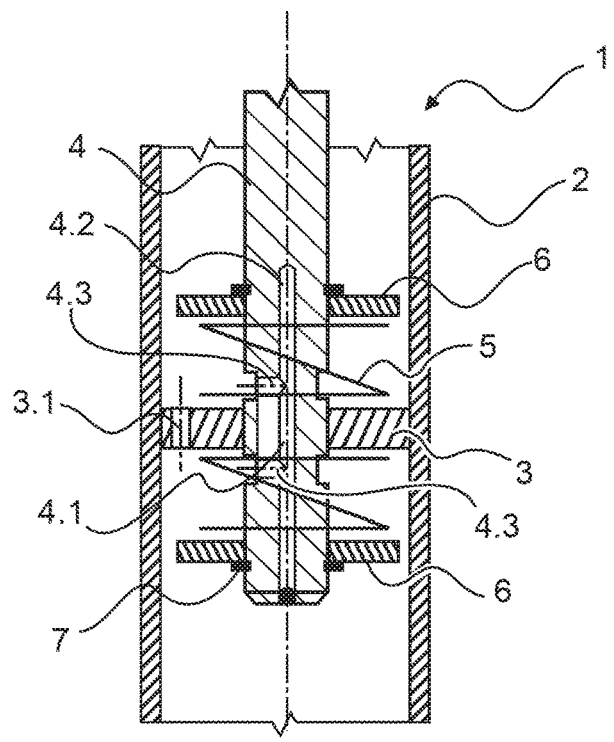
FIG. 2 is a cross-section view of a second embodiment of the invention.

FIG. 2 shows another embodiment of a safety brake according to the invention, wherein the second fluid channel 4.1 is formed by a vertical bore 4.2 along the central axis of the piston rod and two horizontal bores 4.3, which are positioned above and below the piston 3, when the piston 3 is in the predetermined position in the normal state of the gas pressure spring.

Figure 3:
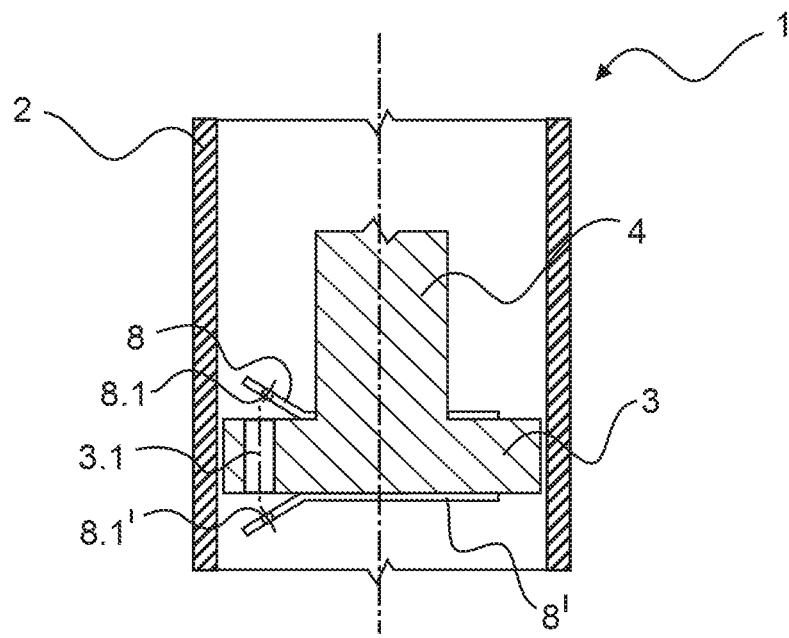
FIG. 3 is a cross-section view of a third embodiment of the invention.

FIG. 3 shows another embodiment of a safety brake according to the invention, wherein, in this case, the second fluid passage is not formed at the piston rod 4 itself. Furthermore, the piston rod 4 is firmly connected to the piston 3.

In this embodiment of the safety brake according to the invention, the piston is provided with two spring elements 8 and 8' arranged on an upper side and a lower side of the piston, respectively.

In a normal state of the gas pressure spring the spring elements 8 and 8' protrude away from the piston 3 in an area above and below the nozzle 3.1, as shown in FIG. 3

In this area of the nozzle 3.1, each of the spring elements 8 and 8' includes openings 8.1 and 8.1', which are smaller in diameter than the nozzle 3.1 itself.

Figure 4:
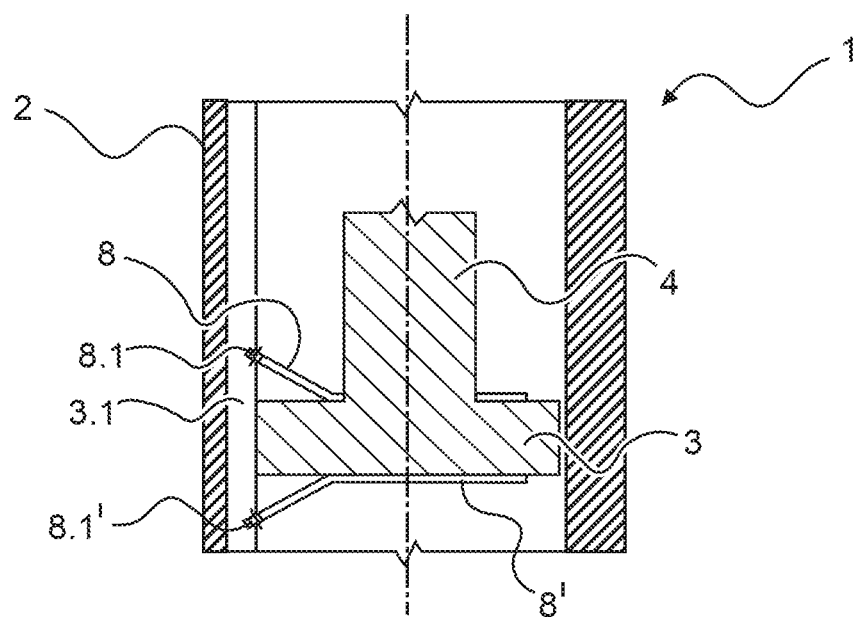
FIG. 4 is a cross-section view of a fourth embodiment of the invention.

It is also possible to provide the cylinder 2 with a groove and, in turn, to provide the piston 3 without nozzle, as shown in the embodiment of FIG. 4, whereby, in this case, the first fluid channel 3.1 is formed by the groove. In this embodiment, the spring elements 8 and 8' are dimensioned such that they project into the groove 3.1.

If the table, as in the example described for the first embodiment above, is loaded with an excessive load during the height adjustment, again a local pressure increase on the lower piston side arises, whereby the lower spring element 8' is pushed towards the piston 3 and a new fluid passage 8.1 with a reduced diameter compared to the first fluid channel 3.1, i.e. a diameter corresponding to the diameter of the opening 8.1', forms.

In this case, the fluid may also only pass through the second fluid passage 8.1 in a slowed down manner, whereby the overall system of the gas pressure spring is damped and the movement of the height adjustment is decelerated.

With respect to the removal of the table load during adjustment, the embodiments according to FIGS. 3 and 4 are similar to the example described for the first embodiment above, wherein in case of the removal of the load a pressure increase on the upper piston side pushes the upper spring element 8 towards the piston 3 and the reduced cross-section of the second fluid channel 8.1, 8.1' also causes a braking effect.

The invention claimed is:

1. A braking device for a height-adjustable furniture column, the braking device comprising:
    a cylinder and a piston arranged within the cylinder, the piston comprising an upper piston side and a lower piston side;
    a piston rod;
    a first fluid passage placing the upper piston side and the lower piston side in a first fluid connection;
    a second fluid passage in fluid connection with the first fluid passage, the second fluid passage and the first fluid passage placing the upper piston side and the lower piston side in a second fluid connection;
    a third fluid passage in fluid connection with the first fluid passage, the third fluid passage and the first fluid passage placing the upper piston side and the lower piston side in a third fluid connection;
    a first spring disposal at the upper piston side, the first spring comprising a first spring opening, the first spring opening having a first diameter that is smaller than a first fluid passage diameter of the first fluid passage; and
    a second spring disposed at the lower piston side, the second spring comprising a second spring opening, the second spring opening having a second diameter that is smaller than the first fluid passage diameter of the first fluid passage,
    wherein the second fluid passage is formed by the first spring opening;
    wherein the third fluid passage is formed by the second spring opening.

2. The braking device according to claim 1, wherein the piston rod is movable with respect to the piston.

3. The braking device according to claim 1, wherein the piston rod is connected to the piston.

4. A method of restricting a maximum speed of a height adjustment of a furniture item, the furniture item having a height-adjustable column, the furniture item comprising
    a braking device for the height-adjustable furniture column, the braking device comprising
        a cylinder and a piston arranged within the cylinder, the piston comprising an upper piston side and a lower piston side;
        a piston rod;
        a first fluid passage placing the upper piston side and the lower piston side in a first fluid connection;

a second fluid passage in fluid connection with the first fluid passage, the second fluid passage and the first fluid passage placing the upper piston side and the lower piston side in a second fluid connection;

a third fluid passage in fluid connection with the first fluid passage, the third fluid passage and the first fluid passage placing the upper piston side and the lower piston side in a third fluid connection;

a first spring disposal at the upper piston side, the first spring comprising a first spring opening, the first spring opening having a first diameter that is smaller than a first fluid passage diameter of the first fluid passage; and a second spring disposed at the lower piston side, the second spring comprising a second spring opening, the second spring opening having a second diameter that is smaller than the first fluid passage diameter of the first fluid passage, wherein the second fluid passage is formed by the first spring opening;

wherein the third fluid passage is formed by the second spring opening:

the method comprising the steps of:
(a) transmitting a force effect on a movable portion of the furniture item onto the piston rod,
(b) adjusting a position of the second fluid passage or the third fluid passage with respect to the piston,
(c) restricting an adjustment speed of the heights-adjustable furniture column;

wherein step (a) further includes transmitting the force effect additionally on the piston;

wherein step (b) is performed by
creating an overpressure on a side of the piston facing away from the force effect,
pushing the first spring or the second spring towards the piston,
restricting the first fluid passage diameter to the diameter of the second or third fluid connection.

5. A braking device for a height-adjustable furniture column, the braking device comprising:
a cylinder and a piston arranged within the cylinder, the piston comprising an upper piston side and a lower piston side;
a piston rod connected to the piston;
a first fluid passage disposed in the piston, the first fluid passage being spaced from the first piston rod, the first fluid passage placing the upper piston side and the lower piston side in a first fluid connection;
a gas pressure spring comprising a first spring element proximal to the upper piston side and a second spring element proximal to the lower piston side;
the first spring element having a first spring element end portion angles away from the upper piston side by a first angle and the second spring element having a second spring element end portion angled away from the lower piston side by a second angle; and
a second fluid passage disposed through the first spring element end portion and a third fluid passage disposed through the second spring element end portion.

6. The braking device of claim 5, wherein the first angle is responsive to a force pressure directly directed onto the upper piston side resulting from adjusting a height of the furniture column.

7. The braking device of claim 6, wherein the second angle is responsive to a force pressure directly directed onto the upper piston side resulting from adjusting a height of the furniture column.

8. The braking device of claim 5, wherein the second angle is responsive to a force pressure directly directed onto the lower piston side resulting from adjusting a height of the furniture column.

9. The braking device of claim 5; wherein the second spring element end portion is responsive to a force pressure directly directed onto the upper piston side resulting from adjusting a height of the furniture column.

10. The braking device of claim 9, wherein the second spring element end portion is responsive to a force pressure directly directed onto the lower piston side resulting from adjusting a height of the furniture column.

11. The braking device of claim 5, wherein the second spring element end portion is responsive to a force pressure directly directed onto the lower piston side resulting from adjusting a height of the furniture column.

12. The braking device of claim 5, wherein the first spring element and the second spring element are separated by only one piston.

* * * * *